United States Patent [19]

Sugiyama

[11] Patent Number: 4,772,108
[45] Date of Patent: Sep. 20, 1988

[54] MACRO LENS SYSTEM
[75] Inventor: Takahiro Sugiyama, Tokyo, Japan
[73] Assignee: Asahi Kogaku Kogyo Kabushiki Kaisha, Tokyo, Japan
[21] Appl. No.: 1,481
[22] Filed: Jan. 8, 1987
[30] Foreign Application Priority Data
    Jan. 8, 1986 [JP] Japan .................................. 61-2559
[51] Int. Cl.$^4$ ........................... G02B 9/62; G02B 9/64
[52] U.S. Cl. ..................................... 350/464; 350/463
[58] Field of Search ................................ 350/464, 463
[56] References Cited
    FOREIGN PATENT DOCUMENTS
    0188918 9/1985 Japan .................................. 350/463

Primary Examiner—John K. Corbin
Assistant Examiner—Rebecca D. Gass
Attorney, Agent, or Firm—Sughrue, Mion, Zinn, Macpeak, and Seas

[57] ABSTRACT

A macro lens system consisting from the object side of a front unit of negative focal length, a middle unit of positive focal length and a rear unit of large focal length. During focusing, all lens units are displaced. Additionally the front and middle units are displaced en masse with respect to the rear unit. Numerical conditions are given on the focal length of the front unit and of the combination of the front and middle unit and on the relative displacements during focusing.

11 Claims, 10 Drawing Sheets

1

MACRO LENS SYSTEM

BACKGROUND OF THE INVENTION

1. Field of the Invention

The present invention relates to a photographic macro lens system.

2. Background of the Invention

A large number of photographic macro lens systems have been invented and used commercially. Most of the systems that feature viewing angles of the order of ±23° are composed of Gauss type lenses or modifications thereof. In these systems, the amount of lens displacement required for attaining a focused condition is not unduly large if the image magnification desired is approximately ½. However, if the magnification is increased to unity (1 X), the amount of lens displacement necessary for attaining a focused state becomes excessive and the manipulability of the system is impaired.

SUMMARY OF THE INVENTION

Accordingly, an object of the present invention is to provide a macro lens system featuring a viewing angle of the order of ±23° C. that permits efficient aberrational correction not only for close-up shooting but also for far-distance shooting and which requires a smaller amount of lens displacement to achieve focusing and which therefore is easy to manipulate.

The macro lens system of the present invention comprises, in order from the object side, a front unit having an overall negative focal length, a middle unit having a overall positive focal length, and a rear unit having a large overall positive or negative focal length. The system is so constructed that focusing from far-distance shooting to near-distance shooting can be achieved by causing the rear unit to be displaced simultaneously with the displacement of the front and middle units and en masse.

BRIEF DESCRIPTION OF THE DRAWINGS

FIGS. 8 and 9 are graphs plotting the aberration curves obtained in Example 3 by shooting at infinite distance (FIG. 8) and at magnification of unity (FIG. 9);

DETAILED DESCRIPTION OF THE PREFERRED EMBODIMENTS

The macro lens system of the present invention solves the aforementioned problems of the prior art system by reducing the focal lengths of the moving lens units in order to minimize the amount of lens displacement necessary for attaining a focused condition. Stated more specifically, the system of the present invention does not employ moving lens units of the "normal" lens type which are composed of Gauss type lenses or modifications thereof. Instead, the moving lens units employed in the present invention are of the retrofocus type which incorporates a negative front lens unit.

As shown for several embodiments in FIGS. 1, 4, 7, 10, 13, 16 and 19, the macro lens system of the present invention comprises, in order from the object side, a front unit 10 having an overall negative focal length, a middle unit 20 having an overall positive focal length, and a rear unit 30 having a large overall positive or negative focal length. The system is so constructed that focusing from far-distance shooting to near-distance shooting can be achieved by causing the rear unit 30 to be displaced simultaneously with the displacement of the front and middle units 10 and 20 en masse. The system is further characterized by satisfying the following conditions:

(1) $-1.0 < f/f_1 < -0.1$
(2) $1.0 < f/f_{12} < 1.7$
(3) $0.1 < \Delta x_2 / \Delta x_1 < 1.0$ where f is the composite focal length of the overall lens system; $f_1$ is the composite focal length of the front unit 10; $f_{12}$ is the composite focal length of the front and middle units 10 and 20; $\Delta x_1$ is the amount of displacement of the front and middle units 10 and 20 during focusing; and $\Delta x_2$ is the amount of displacement of the rear unit 30 during focusing.

Figure 1:
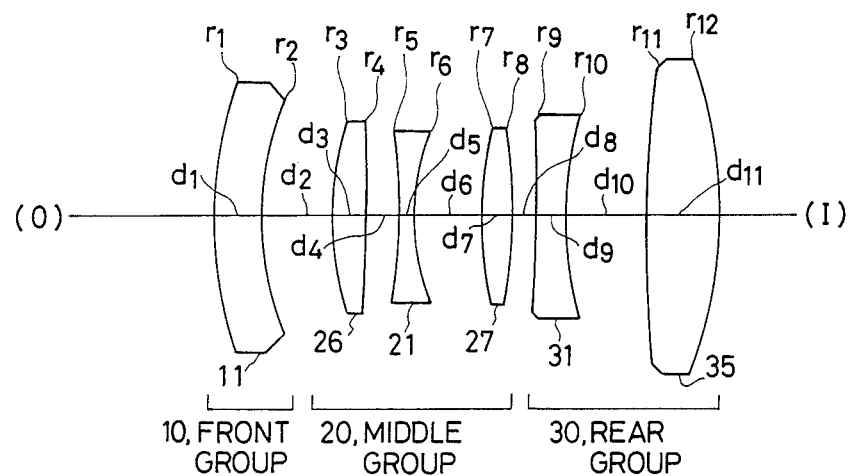
FIG. 1 is a simplified cross-sectional view of the macro lens system fabricated in Example 1.
Figure 4:
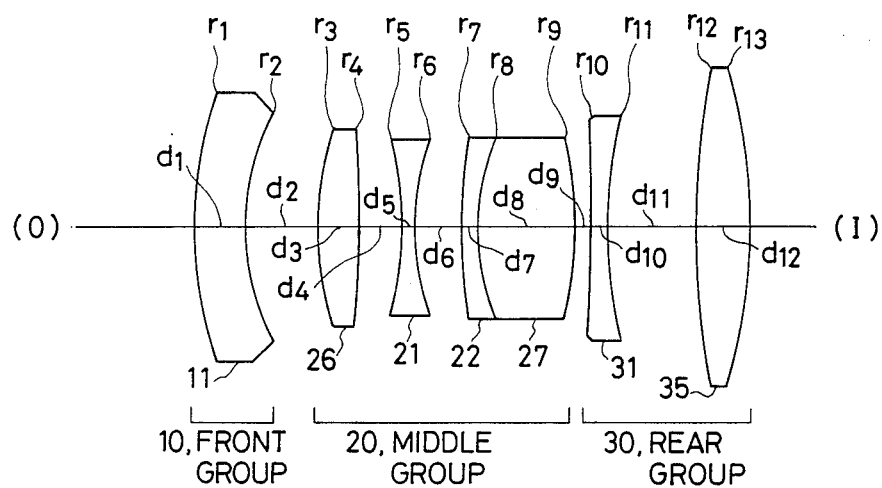
FIG. 4 is a simplified cross-sectional view of the macro lens system fabricated in Example 2.
Figure 2:
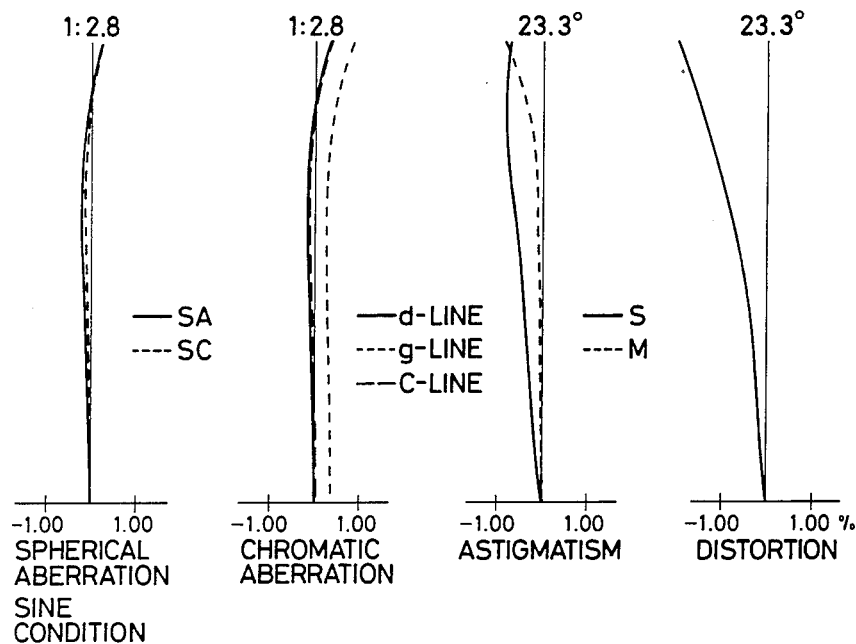
FIGS. 2 and 3 are graphs plotting the aberration curves obtained in Example 1 by shooting at infinite distance (FIG. 2) and at magnification of unity (FIG. 3)
Figure 3:
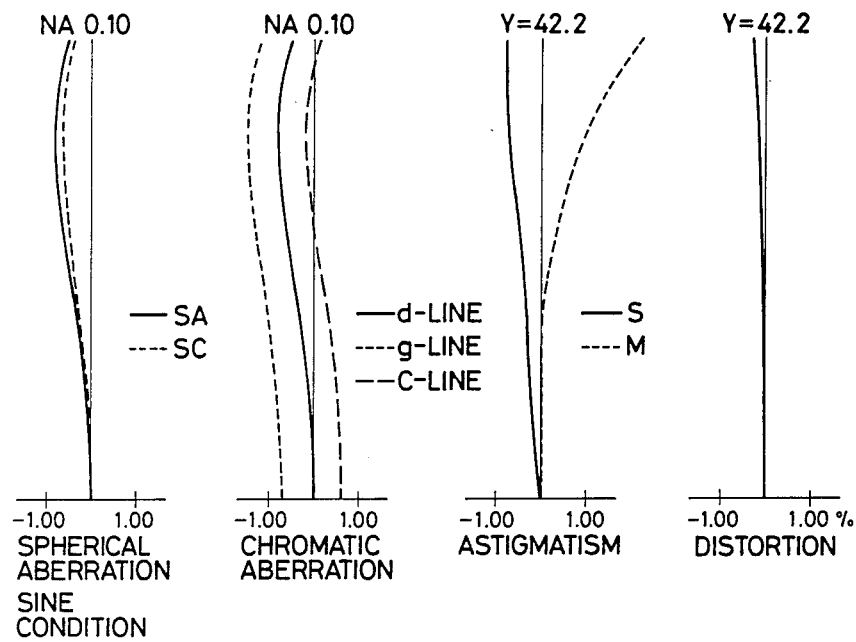
Figure 5:
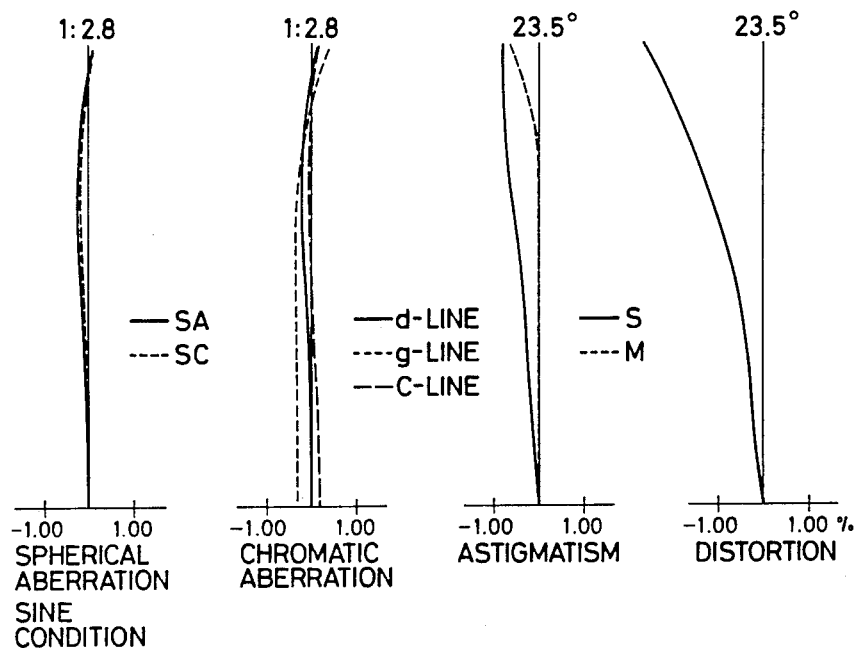
FIGS. 5 and 6 are graphs plotting the aberration curves obtained in Example 2 by shooting at infinite distance (FIG. 5) and at magnification of unity (FIG. 6)
Figure 6:
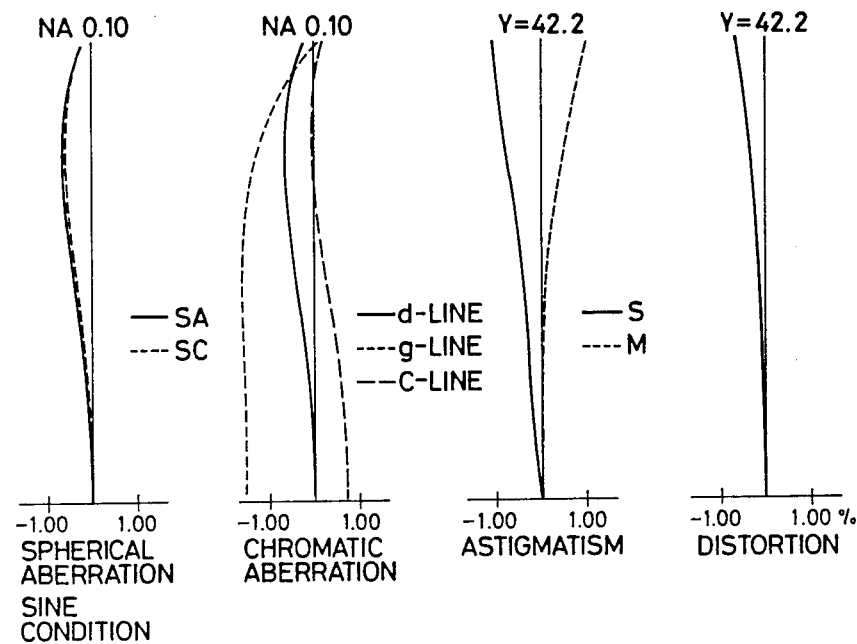
Figure 7:
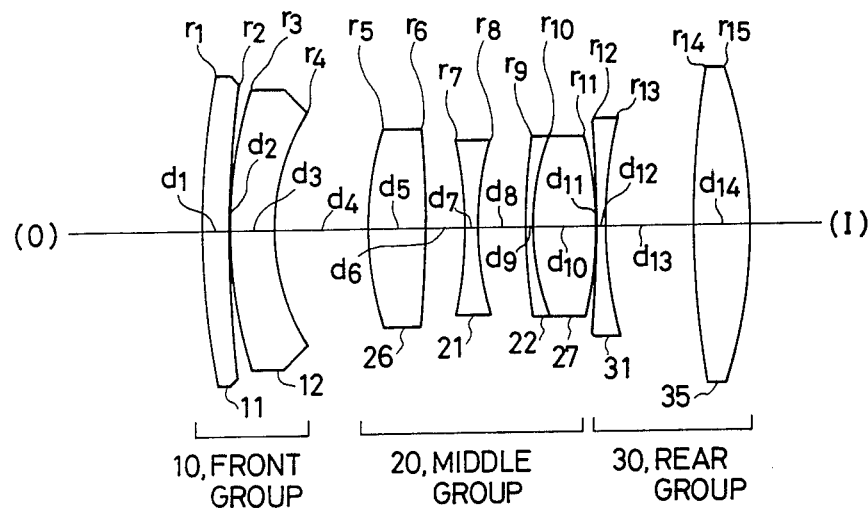
FIG. 7 is a simplified cross-sectional view of the macro lens system fabricated in Example 3.
Figure 10:
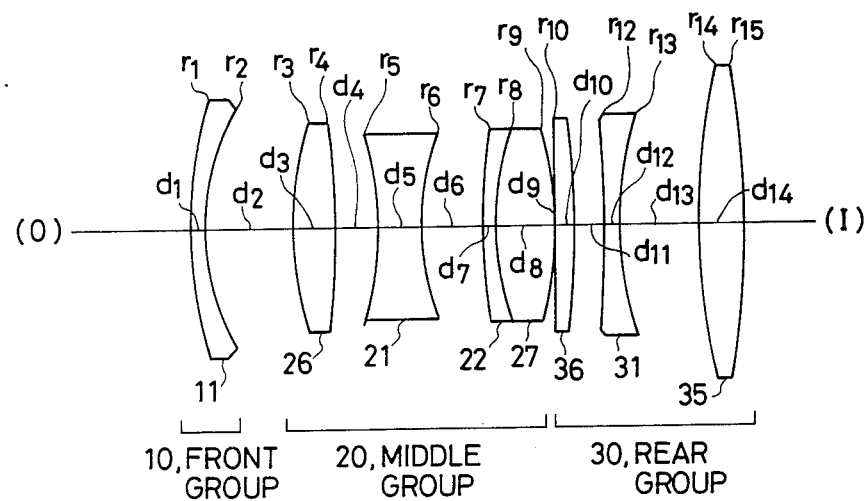
FIG. 10 is a simplified cross-sectional view of the macro lens system fabricated in Example 4.
Figure 11:
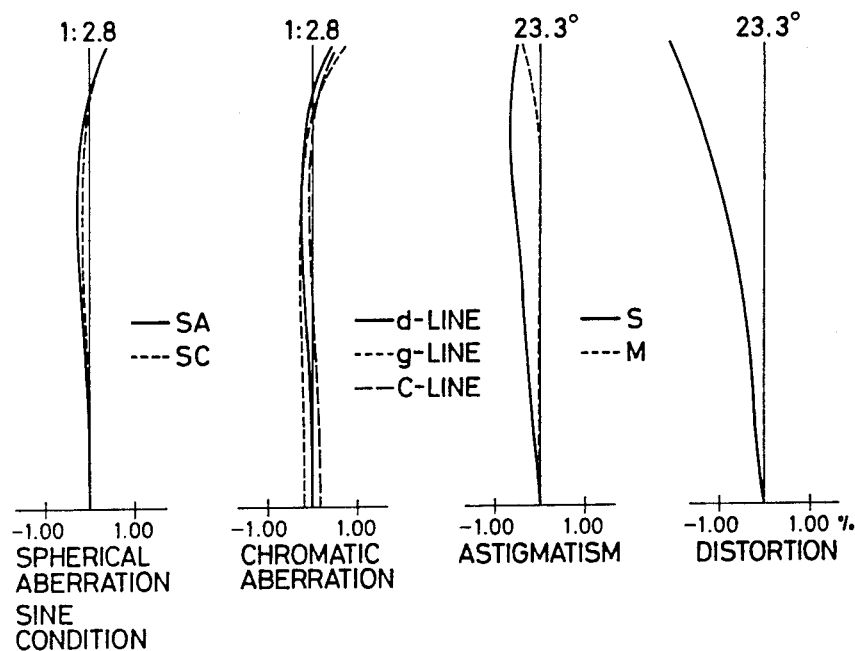
FIGS. 11 and 12 are graphs plotting the aberration curves obtained in Example 4 by shooting at infinite distance (FIG. 11) and at magnification of unity (FIG. 12)
Figure 12:
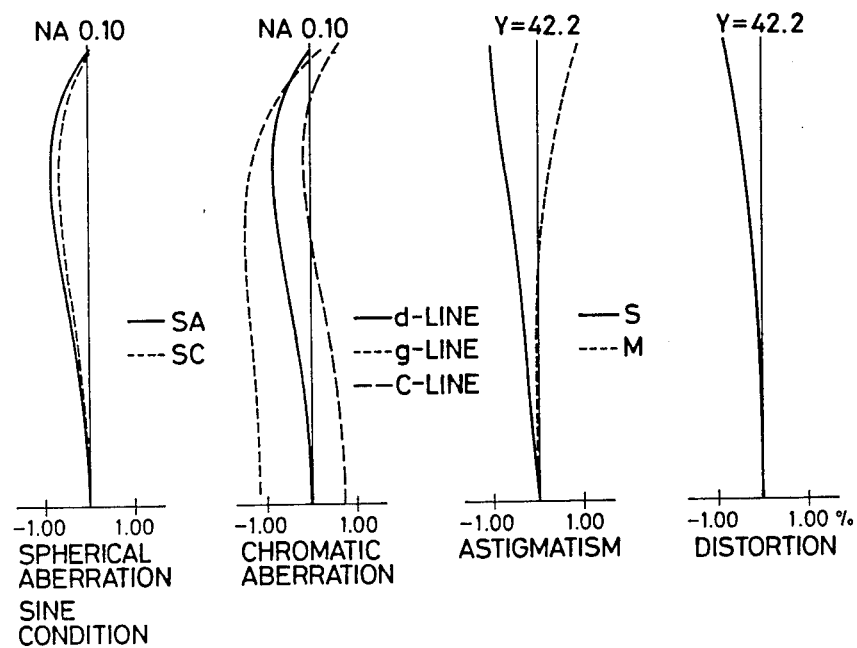
Figure 13:
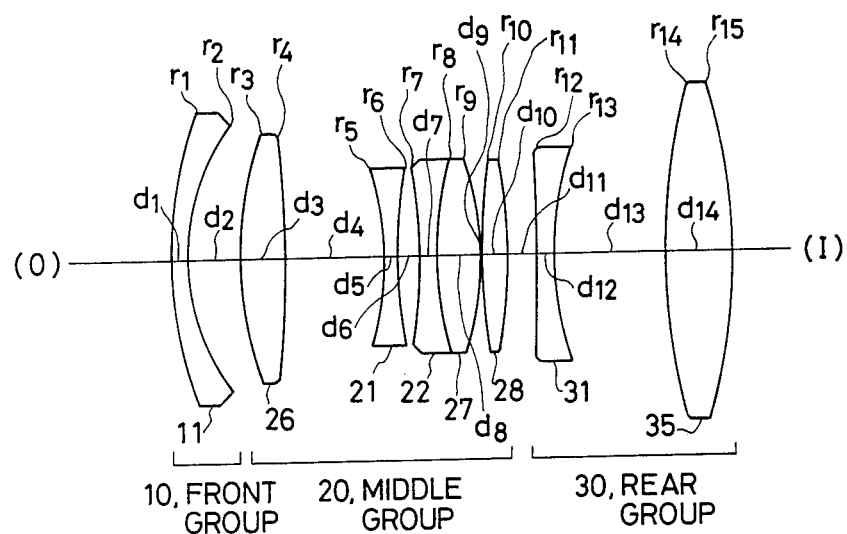
FIG. 13 is a simplified cross-sectional view of the macro lens system fabricated in Example 5.
Figure 16:
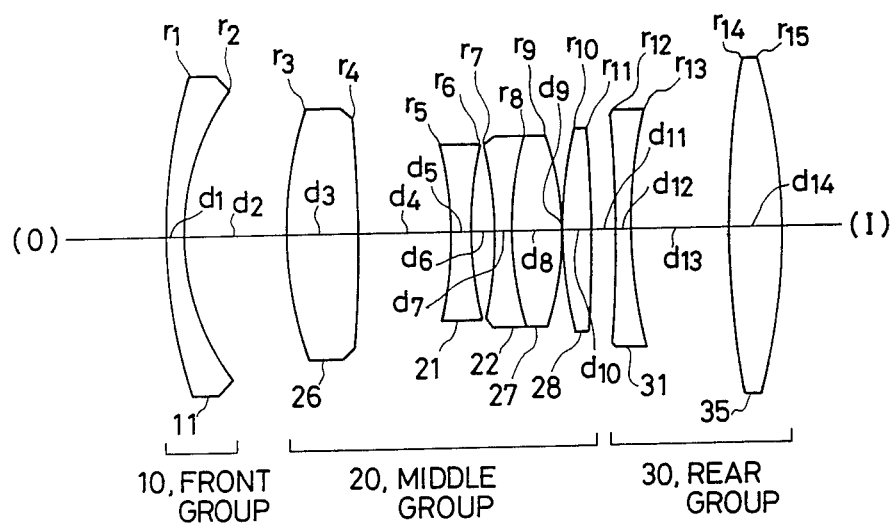
FIG. 16 is a simplified cross-sectional view of the macro lens system fabricated in Example 6.
Figure 14:
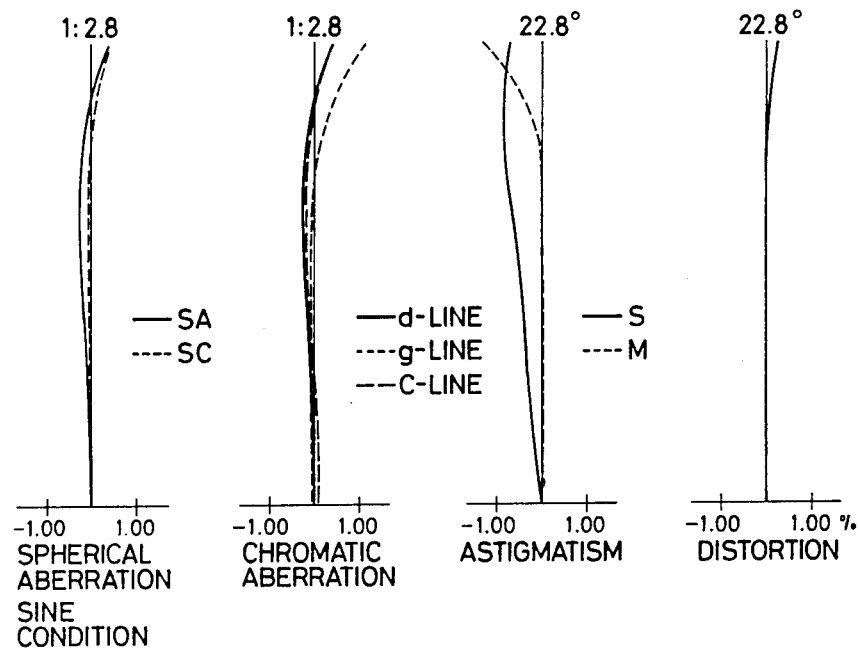
FIGS. 14 and 15 are graphs plotting the aberration curves obtained in Example 5 by shooting at infinite distance (FIG. 14) and at magnification of unity (FIG. 15)
Figure 15:
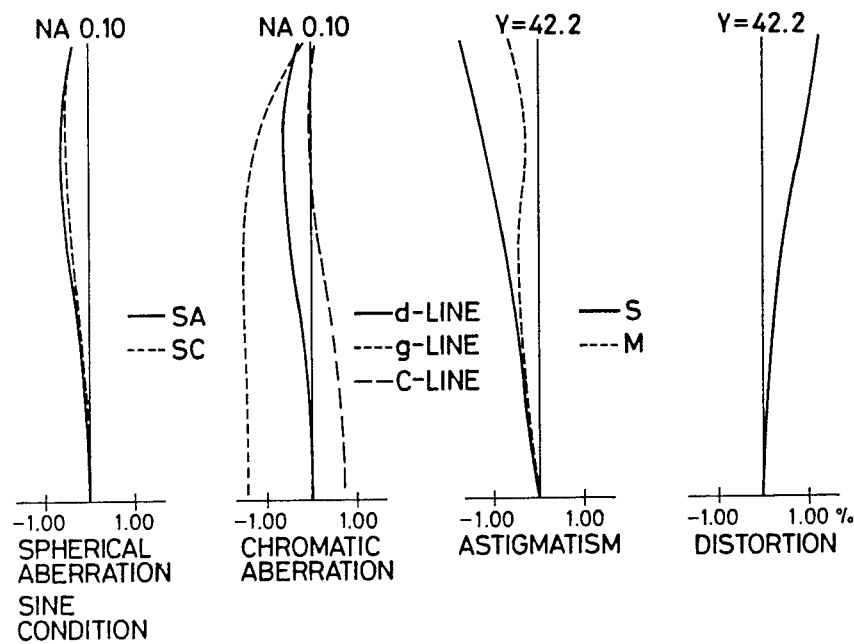
Figure 17:
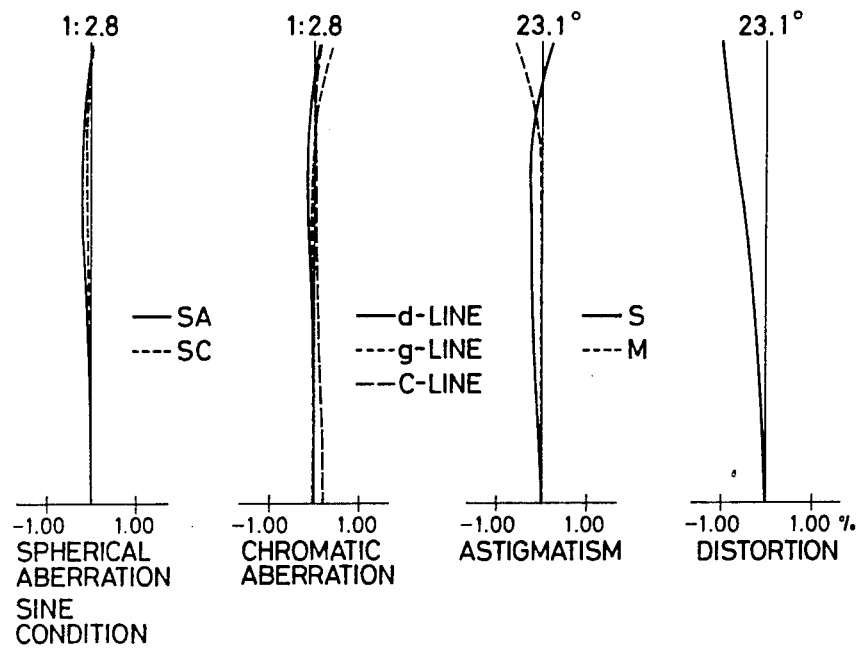
FIGS. 17 and 18 are graphs potting the aberration curves obtained in Example 6 by shooting at infinite distance (FIG. 17) and at magnification of unity (FIG. 18)
Figure 18:
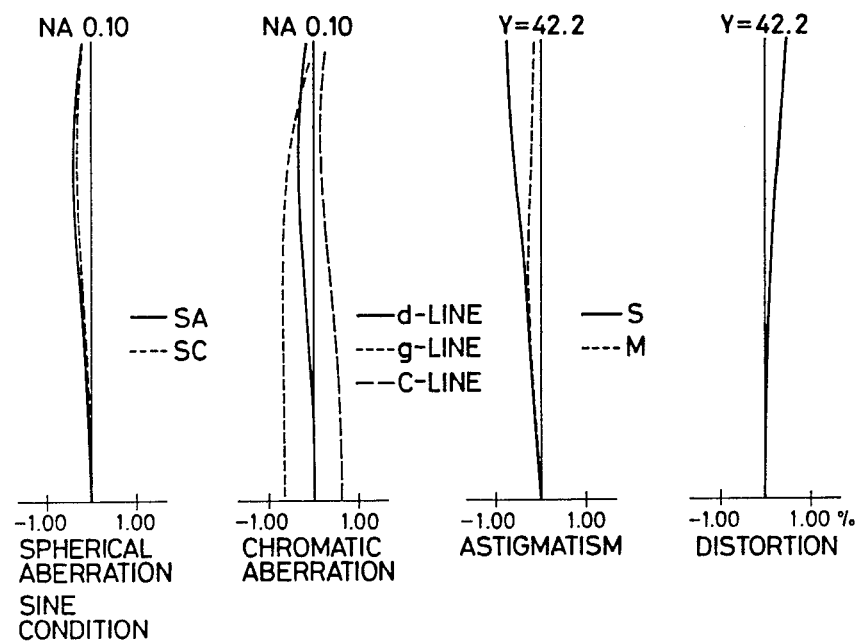
Figure 19:
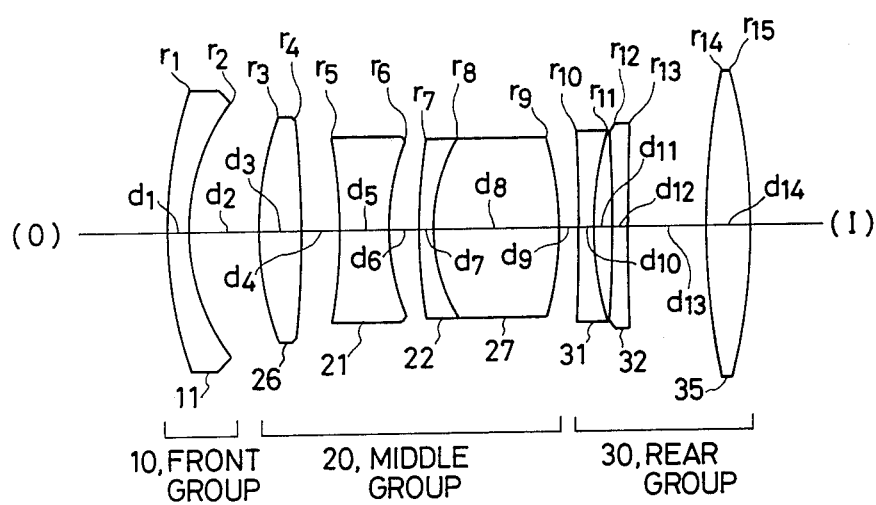
FIG. 19 is a simplified cross-sectional view of the macro lens system fabricated in Example 7.
Figure 20:
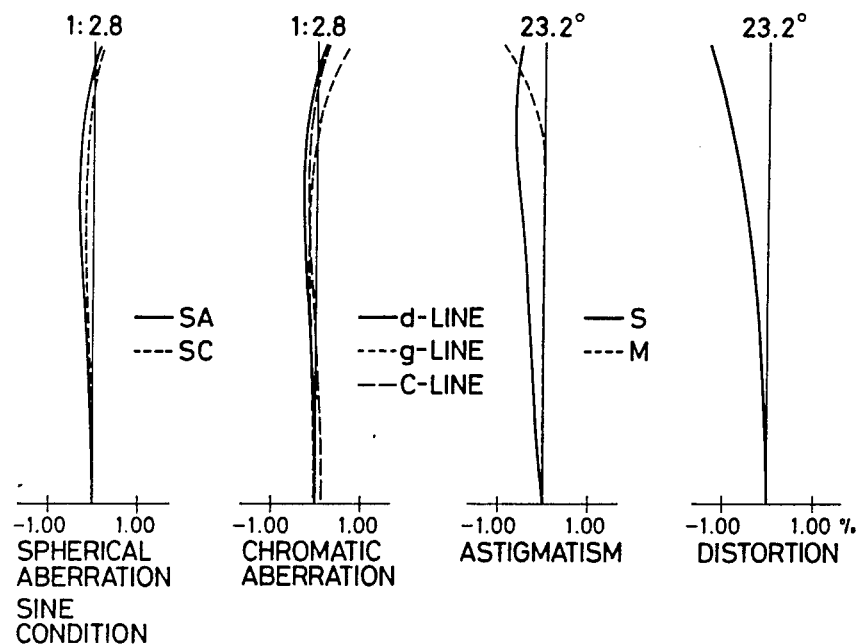
FIGS. 20 and 21 are graphs plotting the aberration curves obtained in Example 7 by shooting at infinite distance (FIG. 20) and at magnification of unity (FIG. 21).
Figure 21:
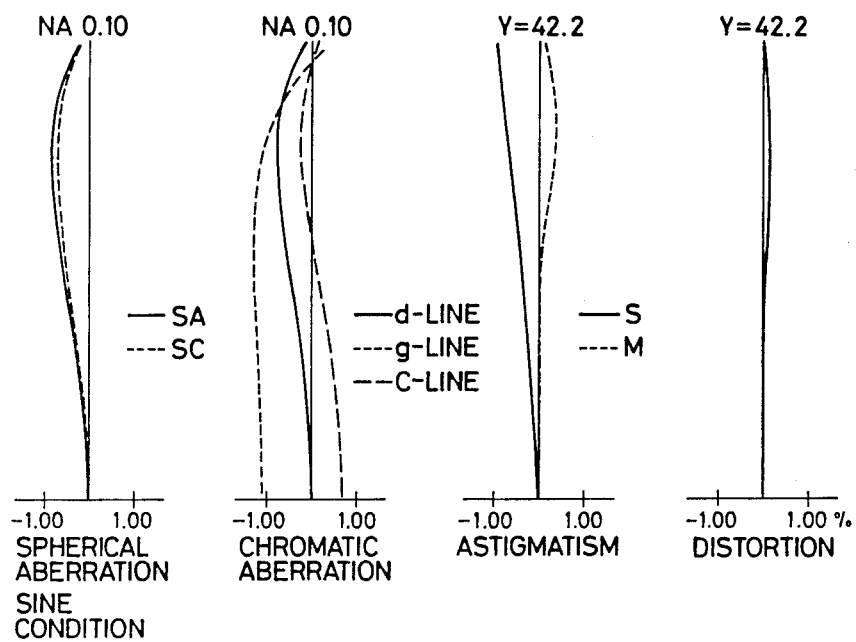

The lens arrangement of the macro lens system of the present invention is described hereunder in greater detail. The front unit 10 is composed of a single negative lens element 11 (FIGS. 1, 4, 10, 13, 16 and 19) or a combination of one positive lens element 12 and one negative lens element 11 (FIG. 7). The middle unit 20 is composed of one negative lens element 21 (FIG. 1), at least two negative lens elements 21 and 22 (FIGS. 4, 7, 10, 13, 16 and 19) and two positive lens elements 26 and 27 (FIGS. 1, 4, 7, 10 and 19), or at least three positive lens elements 26, 27 and 28 (FIGS. 13 and 16). More specifically, the middle unit 20 consists of either: (1) three elements in three units, i.e. a positive lens element 26, a negative lens element 21 and a positive lens element 27 (FIG. 1); (2) four elements in three units, i.e., a positive lens element 26, a negative lens element 21, and a negative lens 22 cemented to a positive lens 27 (FIGS. 4, 7, 10, 13 and 19); or (3) five elements in four units, i.e., a positive lens element 26, a negative lens element 21, a negative lens 22 cemented to a positive lens 27, and a positive lens element 28 (FIG. 16). The rear unit 30 is composed of one negative lens element 31 (FIGS. 1, 4, 7, 10, 13 and 16), at least two negative lens elements 31 and 32 (FIG. 19) and one positive lens element 35, or at least two positive lens elements 36 and 36. More specifically, the rear unit consists of either: (1) two elements in to units, i.e., a negative lens element 31 and a positive lens element 35 (FIGS. 1, 4, 7, 13 and 16); or (2) three elements in three units, i.e., a combination of positive 36, negative 31, and positive 35 lens elements (FIG. 10), or a combination of negative 31, negative 32 and positive 35 lens elements (FIG. 19).

The three conditions that must be satisfied by the macro lens system of the present invention are discussed in the following. Condition (1) must be satisified in order to achieve efficient correction of astigmatism with a given composite focal length of the front group. This condition, which is related to condition (2), is essential for realizing the fundamental feature of the present invention, that is, shortening the focal lengths of the front and middle units with a view to minimizing the amount of lens displacement necessary to achieve the right focus. Any astigmatism that may occur as a result of reducing the focal lengths of the front and middle units is intended to be effectively corrected by a retrofocus-type optical system. In order to meet this end, the composite focal length of the front unit is set to lie within the range specified by condition (1). If $f/f_1$ is greater than the upper limit, the retrofocusing nature of the optics is insufficient to achieve efficient correction of astigmatism. If $f/f_1$ is smaller than the lower limit, conditions are provided which are favorable not only for the purpose of correcting any resulting astigmatism but for reducing the amount of lens displacement necessary to achieve focusing. However, an unacceptably large positive spherical aberration will occur.

Condition (2) must be satisfied in order to reduce the amount of lens displacement necessary for achieving proper focusing with a given composite focal length of the moving front and middle lens units. If $f/f_{12}$ exceeds the upper limit, the focal lengths of the moving lens units are reduced so as to provide a favorable condition for the purpose of reducing the amount of lens displacement necessary to achieve correct focusing. However, when combined with condition (1), this causes an astigmatism that is too great to correct efficiently. If, on the other hand, $f/f_{12}$ is smaller than the lower limit of condition (2), the amount of lens displacement necessary to achieve focusing increases to an unacceptably high level.

Condition (3) as combined with condition (2) determines the amount of lens displacement necessary for achieving focusing. In order to reduce the amount of lens displacement, it is more advantageous to displace lens units having small focal lengths. If $\Delta x_2/\Delta x_1$ is larger than the upper limit, the amount amount lens displacement is increased to an unacceptably high level. If $\Delta x_2/\Delta x_1$ is smaller than the lower limit, the amount of lens displacement is decreased, which is favorable for attaining the purposes of the present invention. However, there occurs an unacceptably great change in aberration, astigmatism in particular, as between shooting at infinite distance and shooting at closest distance.

Tables for the macro lens systems designed in Examples 1 to 7 of the present invention are given below. In these tables, f is the focal length, $F_{NO}$ is an f-number, $r_i$ is the radius of curvature of a lens plane i, $d_i$ is the distance between an i-th plane and an adjacent (i+1)-th plane (either through a lens or through space), $N_i$ is the refractive index of the lens element, having the i-th lens surface on its object side and i is the Abbe number of the lens element having the i-th lens surface on its object side.

FIGS. 1, 4, 7, 10, 13, 16 and 19 show the detailed structure of the respective seven examples and an identification of the elements listed in the tables. The remaining figures show aberrational curves for each of the examples. There are two figures for each example. The first figures, FIGS. 2, 5, 8, 11, 14, 17 and 20 are for a lens focus set at infinity. The second figures, FIGS. 3, 6, 9, 12, 15, 18 and 21 are with the lens set at a magnification of unity. Each figure contains four graphs. The first graph plots the spherical aberration (SA) and sine condition (SC) as a function of f-stop (infinite focus) or numerical aperture NC (unity magnification). The second graph plots the chromatic aberration for the d-line, g-line and C-line as a function of f-stop or numerical aperture. The third graph plots astigmatism in the sagittal (S) direction and the meridional (M) direction as a function of viewing angle (infinite focus) or radial distance Y (unit magnification). The fourth graph plot distortion as a function of viewing angle or radial position.

EXAMPLE 1

| | f = 100 | $F_{NO}$ = 1:2.8 | viewing angle = ±23.3° | |
|---|---|---|---|---|
| i | $r_i$ | $d_i$ | $N_i$ | $v_i$ |
| 1 | 72.308 | 9.750 | 1.49782 | 66.8 |
| 2 | 54.000 | 13.202 | | |
| 3 | 54.598 | 6.491 | 1.83481 | 42.7 |
| 4 | −377.813 | 6.293 | | |
| 5 | −84.803 | 2.925 | 1.63636 | 35.4 |
| 6 | 42.240 | 12.704 | | |
| 7 | 77.489 | 5.978 | 1.80400 | 46.6 |
| 8 | −99.689 | 4.519* | | |
| 9 | −384.029 | 5.464 | 1.80518 | 25.4 |
| 10 | 63.526 | 15.600 | | |
| 11 | 241.955 | 13.650 | 1.77250 | 49.6 |
| 12 | −83.960 | | | |

*$d_8$ = 17.798 at photographic magnification of 1
$f/f_1$ = 100/−520.555 = −0.19
$f/f_{12}$ = 100/81.250 = 1.23
$\Delta x_2/\Delta x_1$ = 81.570/94.849 = 0.86

EXAMPLE 2

| | f = 100 | $F_{NO}$ = 1:2.8 | viewing angle = ±23.5° | |
|---|---|---|---|---|
| i | $r_i$ | $d_i$ | $N_i$ | $v_i$ |
| 1 | 76.873 | 9.750 | 1.49782 | 66.8 |
| 2 | 43.477 | 13.732 | | |
| 3 | 62.722 | 8.014 | 1.80740 | 35.4 |
| 4 | −215.387 | 7.954 | | |
| 5 | −71.670 | 2.923 | 1.61293 | 37.0 |
| 6 | 54.690 | 8.295 | | |
| 7 | 120.916 | 2.925 | 1.80518 | 25.4 |
| 8 | 41.135 | 18.511 | 1.81600 | 46.6 |
| 9 | −71.210 | 3.594* | | |
| 10 | −302.246 | 2.923 | 1.80440 | 39.6 |
| 11 | 74.911 | 16.856 | | |
| 12 | 173.055 | 10.392 | 1.73400 | 51.5 |
| 13 | −97.273 | | | |

*$d_9$ = 27.211 at photographic magnification of 1
$f/f_1$ = 100/−222.654 = −0.45
$f/f_{12}$ = 100/85.986 = 1.16
$\Delta x_2/\Delta x_1$ = 70.854/94.471 = 0.75

EXAMPLE 3

| | f = 100 | $F_{NO}$ = 1:2.8 | viewing angle = ±23.4° | |
|---|---|---|---|---|
| i | $r_i$ | $d_i$ | $N_i$ | $\nu_i$ |
| 1 | 142.161 | 5.318 | 1.69350 | 53.2 |
| 2 | 209.665 | 0.195 | | |
| 3 | 82.605 | 8.748 | 1.49782 | 66.8 |
| 4 | 40.054 | 18.018 | | |
| 5 | 60.953 | 10.802 | 1.83400 | 37.2 |
| 6 | −251.515 | 7.383 | | |
| 7 | −74.114 | 2.851 | 1.60342 | 38.0 |
| 8 | 54.396 | 8.834 | | |
| 9 | 121.748 | 1.950 | 1.80518 | 25.4 |
| 10 | 44.674 | 11.932 | 1.77250 | 49.6 |
| 11 | −65.028 | 0.382* | | |
| 12 | −238.986 | 1.950 | 1.83400 | 37.2 |
| 13 | 74.138 | 16.631 | | |
| 14 | 165.046 | 10.861 | 1.71700 | 47.9 |
| 15 | −88.018 | | | |

*$d_{11}$ = 25.172 at photographic magnification of 1
$f/f_1$ = 100/−241.996 = −0.41
$f/f_{12}$ = 100/83.469 = 1.20
$\Delta x_2/\Delta x_1$ = 67.024/91.814 = 0.73

EXAMPLE 4

| | f = 100 | $F_{NO}$ = 1:2.8 | viewing angle = ±23.3° | |
|---|---|---|---|---|
| i | $r_i$ | $d_i$ | $N_i$ | $\nu_i$ |
| 1 | 78.979 | 2.925 | 1.49782 | 66.8 |
| 2 | 43.756 | 16.643 | | |
| 3 | 60.300 | 8.276 | 1.79952 | 42.2 |
| 4 | −185.076 | 8.040 | | |
| 5 | −66.421 | 8.467 | 1.61293 | 37.0 |
| 6 | 49.856 | 11.049 | | |
| 7 | 103.438 | 2.925 | 1.80518 | 25.4 |
| 8 | 51.460 | 11.248 | 1.77250 | 49.6 |
| 9 | −68.125 | 0.195* | | |
| 10 | −846.731 | 3.869 | 1.51742 | 52.4 |
| 11 | −131.508 | 5.850 | | |
| 12 | −259.174 | 3.001 | 1.79952 | 42.2 |
| 13 | 64.315 | 14.754 | | |
| 14 | 122.981 | 9.023 | 1.73500 | 49.8 |
| 15 | −172.686 | | | |

*$d_9$ = 17.024 at photographic magnification of 1
$f/f_1$ = 100/−202.661 = −0.49
$f/f_{12}$ = 100/84.783 = 1.18
$\Delta x_2/\Delta x_1$ = 76.663/93.492 = 0.82

EXAMPLE 5

| | f = 100 | $F_{NO}$ = 1:2.8 | viewing angle = ±22.8° | |
|---|---|---|---|---|
| i | $r_i$ | $d_i$ | $N_i$ | $\nu_i$ |
| 1 | 80.980 | 3.284 | 1.58913 | 61.0 |
| 2 | 40.997 | 10.249 | | |
| 3 | 71.953 | 8.506 | 1.78590 | 44.2 |
| 4 | −187.467 | 18.672 | | |
| 5 | −51.121 | 2.983 | 1.57501 | 41.5 |
| 6 | 114.182 | 4.007 | | |
| 7 | −112.819 | 2.983 | 1.66680 | 33.0 |
| 8 | 58.570 | 8.432 | 1.72916 | 54.7 |
| 9 | −51.878 | 0.195 | | |
| 10 | 196.453 | 4.854 | 1.71300 | 53.8 |
| 11 | −95.716 | 5.585* | | |
| 12 | −779.226 | 3.253 | 1.83481 | 42.7 |
| 13 | 63.289 | 21.278 | | |
| 14 | 119.578 | 12.849 | 1.54072 | 47.2 |
| 15 | −98.551 | | | |

*$d_{11}$ = 44.037 at photographic magnification of 1
$f/f_1$ = 100/−145.371 = −0.69
$f/f_{12}$ = 100/69.643 = 1.44
$\Delta x_2/\Delta x_1$ = 19.809/58.261 = 0.34

EXAMPLE 6

| | f = 100 | $F_{NO}$ = 1:2.8 | viewing angle = ±23.1° | |
|---|---|---|---|---|
| i | $r_i$ | $d_i$ | $N_i$ | $\nu_i$ |
| 1 | 99.828 | 3.454 | 1.51633 | 64.1 |
| 2 | 44.285 | 19.812 | | |
| 3 | 68.780 | 13.825 | 1.80400 | 46.6 |
| 4 | −245.218 | 17.598 | | |
| 5 | −77.287 | 3.990 | 1.54072 | 47.2 |
| 6 | 68.832 | 4.612 | | |
| 7 | −74.277 | 3.747 | 1.68893 | 31.1 |
| 8 | 72.780 | 9.193 | 1.72916 | 54.7 |
| 9 | −52.946 | 0.462 | | |
| 10 | 106.167 | 5.251 | 1.72916 | 54.7 |
| 11 | −233.650 | 4.604* | | |
| 12 | −276.552 | 2.925 | 1.79952 | 42.2 |
| 13 | 83.797 | 18.704 | | |
| 14 | 173.549 | 10.327 | 1.71700 | 47.9 |
| 15 | −114.597 | | | |

*$d_{11}$ = 48.094 at photographic magnification of 1
$f/f_1$ = 100/−157.487 = −0.63
$f/f_{12}$ = 100/81.379 = 1.23
$\Delta x_2/\Delta x_1$ = 35.583/79.073 = 0.45

EXAMPLE 7

| | f = 100 | $F_{NO}$ = 1:2.8 | viewing angle = ±23.2° | |
|---|---|---|---|---|
| i | $r_i$ | $d_i$ | $N_i$ | $\nu_i$ |
| 1 | 76.392 | 4.114 | 1.51118 | 51.0 |
| 2 | 39.413 | 13.513 | | |
| 3 | 60.604 | 8.038 | 1.83400 | 37.2 |
| 4 | −207.927 | 7.486 | | |
| 5 | −100.197 | 9.347 | 1.57501 | 41.5 |
| 6 | 44.565 | 5.340 | | |
| 7 | 84.743 | 2.925 | 1.72825 | 28.5 |
| 8 | 32.332 | 24.146 | 1.72916 | 54.7 |
| 9 | −63.818 | 3.709* | | |
| 10 | −636.676 | 2.925 | 1.76200 | 40.1 |
| 11 | 62.718 | 3.585 | | |
| 12 | −449.029 | 2.925 | 1.67270 | 32.1 |
| 13 | 898.570 | 15.560 | | |
| 14 | 155.152 | 8.015 | 1.80400 | 46.6 |
| 15 | −120.273 | | | |

*$d_9$ = 33.420 at photographic magnification of 1
$f/f_1$ = 100/−165.507 = −0.60
$f/f_{12}$ = 100/74.252 = 1.35
$\Delta x_2/\Delta x_1$ = 46.471/76.182 = 0.61

As described in the foregoing pages and demonstrated by the tables, the macro lens system of the present invention is composed of three lens units, front, middle and rear units, and is designed to satisfy the three conditions (1) to (3). Because of these features, the system permits efficient aberrational correction for shooting at various distances ranging from infinity to close-up and requires a sufficiently small amount of lens displacement to ensure great ease in manipulation.

What is claimed is:

1. A macro lens system which comprises, in order from the object side:
   a front unit having an overall negative focal length;
   a middle unit having an overall positive focal length; and
   a rear unit having a large overall positive or negative focal length;
   said system being focusable between far-distance shooting to near-distance shooting by causing the rear unit to be displaced simultaneously with the displacement of the front and middle units en masse;
   said system being further characterized by satisfying the following conditions:

(1) $-1.0 < f/f_1 < -0.1$
(2) $1.0 < f/f_{12} < 1.7$
(3) $0.1 < \Delta x_2/\Delta x_1 < 1.0$ where f is the composite focal length of an overall lens system comprising said three units; $f_1$ is the composite focal length of the front unit, $f_{12}$ is the composite focal length of the front and middle units, $\Delta x_1$ is the amount of displacement of the front and middle units during focusing, and $\Delta x_2$ is the amount of displacement of the rear unit during focusing.

2. A macro lens system according to claim 1 wherein the front unit comprises at least one negative lens element, the middle unit comprises at least one negative lens element and at least two positive lens elements, and the rear unit comprises at least a negative lens element and a positive lens element.

3. A macro lens system according to claim 2, wherein $r_i$ is the radius of curvature of the i-th lens surface numbered from the object side, $N_i$ is a refractive index of a lens element having the i-th and (i+1)-th lens surfaces; $d_i$ is the distance between the i-th and (i+1)-th lens surfaces, and $V_i$ is an Abbe number of the lens element having the i-th and (i+1)-th lens surfaces, said three lens units consisting of elements satisfying the following table:

| i | $r_i$ | $d_i$ | $N_i$ | $v_i$ |
|---|---|---|---|---|
| 1 | 72.308 | 9.750 | 1.49782 | 66.8 |
| 2 | 54.000 | 13.202 | | |
| 3 | 54.598 | 6.491 | 1.83481 | 42.7 |
| 4 | −377.813 | 6.293 | | |
| 5 | −84.803 | 2.925 | 1.63636 | 35.4 |
| 6 | 42.240 | 12.704 | | |
| 7 | 77.489 | 5.978 | 1.80400 | 46.6 |
| 8 | −99.689 | 4.519 | | |
| 9 | −384.029 | 5.464 | 1.80518 | 25.4 |
| 10 | 63.526 | 15.600 | | |
| 11 | 241.955 | 13.650 | 1.77250 | 49.6 |
| 12 | −83.960 | | | | wherein $d_8$ is adjustable during focusing and equals 17.798 at a photographic magnification of unity; and wherein $\Delta x_2/\Delta x_1 = 81.570/94.849 = 0.86$.

4. A macro lens system according to claim 2, wherein $r_i$ is the radius of curvature of an i-th lens surface numbered from the object side, $N_i$ is a refractive index of a lens element having the i-th and (i+1)-th lens surface; $d_i$ is the distance between the i-th and (i+1)-th lens surfaces, and $V_i$ is an Abbe number of the lens element having the i-th and (i+1)-th lens surfaces, said three lens units consisting of elements satisfying the following table:

| i | $r_i$ | $d_i$ | $N_i$ | $v_i$ |
|---|---|---|---|---|
| 1 | 76.873 | 9.750 | 1.49782 | 66.8 |
| 2 | 43.477 | 13.732 | | |
| 3 | 62.722 | 8.014 | 1.80740 | 35.4 |
| 4 | −215.387 | 7.954 | | |
| 5 | −71.670 | 2.923 | 1.61293 | 37.0 |
| 6 | 54.690 | 8.295 | | |
| 7 | 120.916 | 2.925 | 1.80518 | 25.4 |
| 8 | 41.135 | 18.511 | 1.81600 | 46.6 |
| 9 | −71.210 | 3.594 | | |
| 10 | −302.246 | 2.923 | 1.80440 | 39.6 |
| 11 | 74.911 | 16.856 | | |
| 12 | 173.055 | 10.392 | 1.73400 | 51.5 |
| 13 | −97.273 | | | | wherein $d_9$ is adjustable during focusing and equals 27.211 at a photographic magnification of unity; and wherein $\Delta x_2/\Delta x_1 = 70.854/94.471 = 0.75$.

5. A macro lens system according to claim 4, wherein said front unit consists of said one negative lens element.

6. A macro lens system according to claim 4, wherein said front unit consists of a combination of said negative lens element and a positive lens element.

7. A macro lens system according to claim 2, wherein $r_i$ is the radius of curvature of an i-th lens surface numbered from the object side, $N_i$ is a refractive index of a lens element having the i-th and (i+1)-th lens surface; $d_i$ is the distance between the i-th and (i+1)-th lens surfaces, and $V_i$ is an Abbe number of the lens element having the i-th and (i+1)-th lens surfaces, said three lens units consisting of elements satisfying the following table:

| i | $r_i$ | $d_i$ | $N_i$ | $v_i$ |
|---|---|---|---|---|
| 1 | 142.161 | 5.318 | 1.69350 | 53.2 |
| 2 | 209.665 | 0.195 | | |
| 3 | 82.605 | 8.748 | 1.49782 | 66.8 |
| 4 | 40.054 | 18.018 | | |
| 5 | 60.953 | 10.802 | 1.83400 | 37.2 |
| 6 | −251.515 | 7.383 | | |
| 7 | −74.114 | 2.851 | 1.60342 | 38.0 |
| 8 | 54.396 | 8.834 | | |
| 9 | 121.748 | 1.950 | 1.80518 | 25.4 |
| 10 | 44.674 | 11.932 | 1.77250 | 49.6 |
| 11 | −65.028 | 0.382 | | |
| 12 | −238.986 | 1.950 | 1.83400 | 37.2 |
| 13 | 74.138 | 16.631 | | |
| 14 | 165.046 | 10.861 | 1.71700 | 47.9 |
| 15 | −88.018 | | | | wherein $d_{11}$ is adjustable during focusing and equals 25.172 at a photographic magnification of unity; and wherein $\Delta x_2/\Delta x_1 = 67.024/91.814 = 0.73$.

8. A macro lens system according to claim 2, wherein $r_i$ is the radius of curvature of an i-th lens surface numbered from the object side, $N_i$ is a refractive index of a lens element having the i-th and (i+1)-th lens surface; $d_i$ is the distance between the i-th and (i+1)-th lens surfaces, and $V_i$ is an Abbe number of the lens element having the i-th and (i+1)-th lens surfaces, said three lens units consisting of elements satisfying the following table:

| i | $r_i$ | $d_i$ | $N_i$ | $v_i$ |
|---|---|---|---|---|
| 1 | 78.979 | 2.925 | 1.49782 | 66.8 |
| 2 | 43.756 | 16.643 | | |
| 3 | 60.300 | 8.276 | 1.79952 | 42.2 |
| 4 | −185.076 | 8.040 | | |
| 5 | −66.421 | 8.467 | 1.61293 | 37.0 |
| 6 | 49.856 | 11.049 | | |
| 7 | 103.438 | 2.925 | 1.80518 | 25.4 |
| 8 | 51.460 | 11.248 | 1.77250 | 49.6 |
| 9 | −68.125 | 0.195 | | |
| 10 | −846.731 | 3.869 | 1.51742 | 52.4 |
| 11 | −131.508 | 5.850 | | |
| 12 | −259.174 | 3.001 | 1.79952 | 42.2 |
| 13 | 64.315 | 14.754 | | |
| 14 | 122.981 | 9.023 | 1.73500 | 49.8 |
| 15 | −172.686 | | | | wherein $d_9$ is adjustable during focusing and equals 17.024 at a photographic magnification of unity; and wherein $\Delta x_2/\Delta x_1 = 76.663/93.492 = 0.82$.

9. A macro lens system according to claim 2, wherein $r_i$ is the radius of curvature of an i-th lens surface numbered from the object side, $N_i$ is a refractive index of a lens element having the i-th and (i+1)-th lens surface; $d_i$ is the distance between the i-th and (i+1)-th lens surfaces, and $V_i$ is an Abbe number of the lens element having the i-th and (i+1)-th lens surfaces, said three lens units consisting of elements satisfying the following table:

| i | $r_i$ | $d_i$ | $N_i$ | $v_i$ |
|---|---|---|---|---|
| 1 | 80.980 | 3.284 | 1.58913 | 61.0 |
| 2 | 40.997 | 10.249 | | |
| 3 | 71.953 | 8.506 | 1.78590 | 44.2 |
| 4 | −187.467 | 18.672 | | |
| 5 | −51.121 | 2.983 | 1.57501 | 41.5 |
| 6 | 114.182 | 4.007 | | |
| 7 | −112.819 | 2.983 | 1.66680 | 33.0 |
| 8 | 58.570 | 8.432 | 1.72916 | 54.7 |
| 9 | −51.878 | 0.195 | | |
| 10 | 196.453 | 4.854 | 1.71300 | 53.8 |
| 11 | −95.716 | 5.585 | | |
| 12 | −779.226 | 3.253 | 1.83481 | 42.7 |
| 13 | 63.289 | 21.278 | | |
| 14 | 119.578 | 12.849 | 1.54072 | 47.2 |
| 15 | −98.551 | | | | wherein $d_{11}$ is adjustable during focusing and equals 44.037 at a photographic magnification of unity; and wherein $\Delta x_2/\Delta x_1 = 19.809/58.261 = 0.34$.

10. A macro lens system according to claim 2, wherein $r_i$ is the radius of curvature of an i-th lens surface numbered from the object side, $N_i$ is a refractive index of a lens element having the i-th and (i+1)-th lens surface; $d_i$ is the distance between the i-th and (i+1)-th lens surfaces, and $V_i$ is an Abbe number of the lens element having the i-th and (i+1)-th lens surfaces, said three lens units consisting of elements satisfying the following table:

| i | $r_i$ | $d_i$ | $N_i$ | $v_i$ |
|---|---|---|---|---|
| 1 | 99.828 | 3.454 | 1.51633 | 64.1 |
| 2 | 44.285 | 19.812 | | |
| 3 | 68.780 | 13.825 | 1.80400 | 46.6 |
| 4 | −245.218 | 17.598 | | |
| 5 | −77.287 | 3.990 | 1.54072 | 47.2 |
| 6 | 68.832 | 4.612 | | |
| 7 | −74.277 | 3.747 | 1.68893 | 31.1 |
| 8 | 72.780 | 9.193 | 1.72916 | 54.7 |
| 9 | −52.946 | 0.462 | | |
| 10 | 106.167 | 5.251 | 1.72916 | 54.7 |
| 11 | −233.650 | 4.604 | | |
| 12 | −276.552 | 2.925 | 1.79952 | 42.2 |
| 13 | 83.797 | 18.704 | | |
| 14 | 173.549 | 10.327 | 1.71700 | 47.9 |
| 15 | −114.597 | | | | wherein $d_{11}$ is adjustable during focusing and equals 48.094 at a photographic magnification of unity; and wherein $\Delta x_2/\Delta x_1 = 35.583/79.073 = 0.45$.

11. A macro lens system according to claim 2, wherein $r_i$ is the radius of curvature of an i-th lens surface numbered from the object side, $N_i$ is a refractive index of a lens element having the i-th and (i+1)-th lens surface; $d_i$ is the distance between the i-th and (i+1)-th lens surfaces, and $V_i$ is an Abbe number of the lens element having the i-th and (i+1)-th lens surfaces, said three lens units consisting of elements satisfying the following table:

| i | $r_i$ | $d_i$ | $N_i$ | $v_i$ |
|---|---|---|---|---|
| 1 | 76.392 | 4.114 | 1.51118 | 51.0 |
| 2 | 39.413 | 13.513 | | |
| 3 | 60.604 | 8.038 | 1.83400 | 37.2 |
| 4 | −207.927 | 7.486 | | |
| 5 | −100.197 | 9.347 | 1.57501 | 41.5 |
| 6 | 44.565 | 5.340 | | |
| 7 | 84.743 | 2.925 | 1.72825 | 28.5 |
| 8 | 32.332 | 24.146 | 1.72916 | 54.7 |
| 9 | −63.818 | 3.709 | | |
| 10 | −636.676 | 2.925 | 1.76200 | 40.1 |
| 11 | 62.718 | 3.585 | | |
| 12 | −449.029 | 2.925 | 1.67270 | 32.1 |
| 13 | 898.570 | 15.560 | | |
| 14 | 155.152 | 8.015 | 1.80400 | 46.6 |
| 15 | −120.273 | | | | wherein $d_9$ is adjustable during focusing and equals 33.420 at a photographic magnification of unity; and wherein $\Delta x_2/\Delta x_1 = 46.471/76.182 = 0.61$.

* * * * *